United States Patent [19]

Becavin et al.

[11] 4,382,259

[45] May 3, 1983

[54] DEVICE FOR SUPPLYING A RADIONAVIGATION SYSTEM OF THE DOPPLER VOR TYPE AND A DOPPLER VOR SYSTEM COMPRISING SAID DEVICE

[75] Inventors: Henri Becavin, Bretigny; Alain Grousseau, Conflans St. Honorine, both of France

[73] Assignee: Thomson-CSF, Paris, France

[21] Appl. No.: 240,283

[22] Filed: Mar. 4, 1981

[30] Foreign Application Priority Data

Mar. 5, 1980 [FR] France ............... 80 04950

[51] Int. Cl.³ ........................... G01S 1/44
[52] U.S. Cl. ........................... 343/106 D
[58] Field of Search ............ 343/106 D, 108 M

[56] References Cited

U.S. PATENT DOCUMENTS 3,896,444 7/1975 Lin .................. 343/106 D

FOREIGN PATENT DOCUMENTS 2347821 11/1977 France .

Primary Examiner—Theodore M. Blum
Attorney, Agent, or Firm—Cushman, Darby & Cushman

[57] ABSTRACT

The device for supplying a Doppler VOR system comprises means for generating the sidebands of an amplitude modulation of a VHF carrier wave, the signals representing the sidebands being amplitude-modulated by a periodic voltage. The device essentially comprises means for coupling and means for adding the amplitude-modulated sidebands so as to produce a signal for supplying antennas having a predetermined spectrum and to compensate for the couplings which exist between the antennas.

10 Claims, 6 Drawing Figures

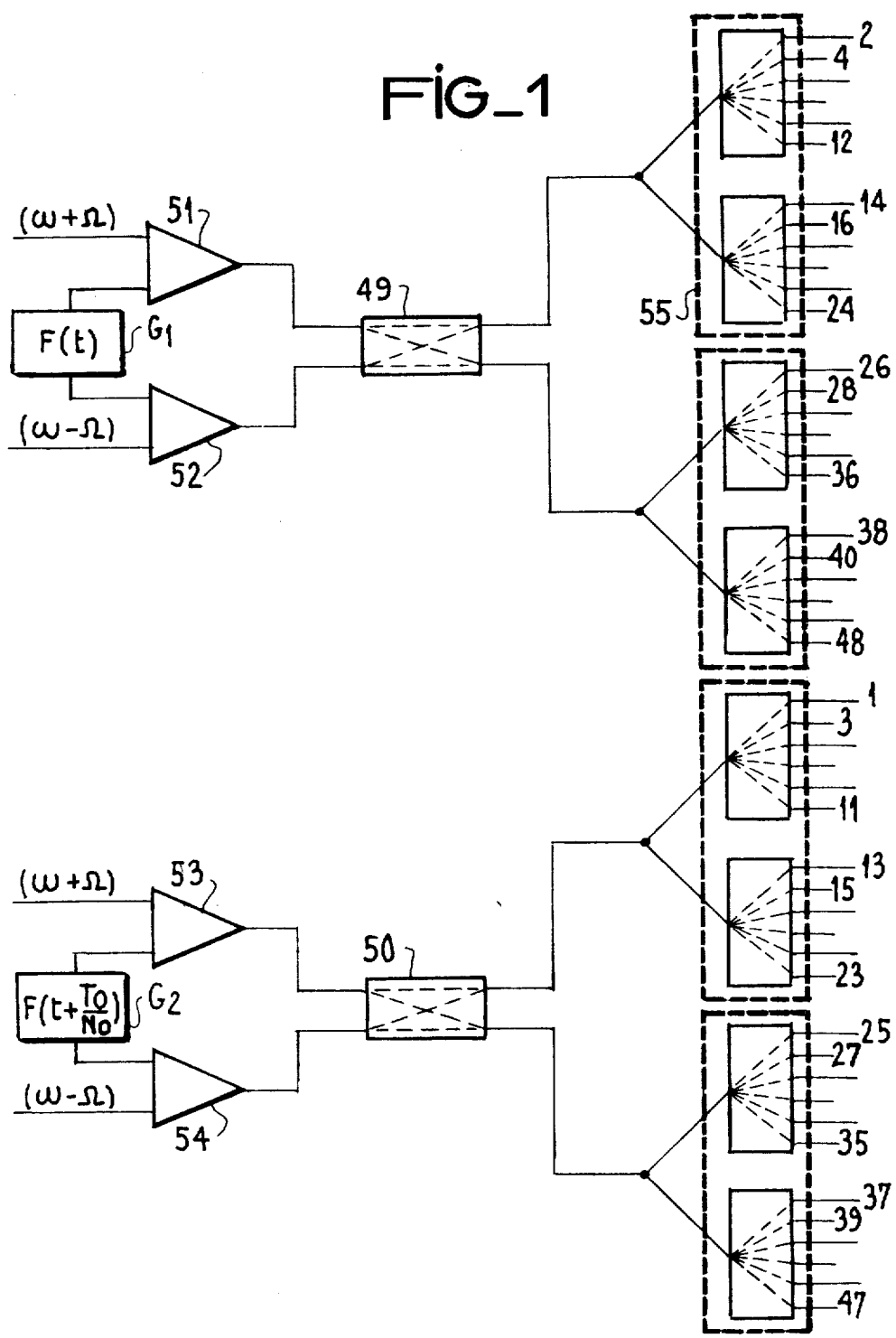

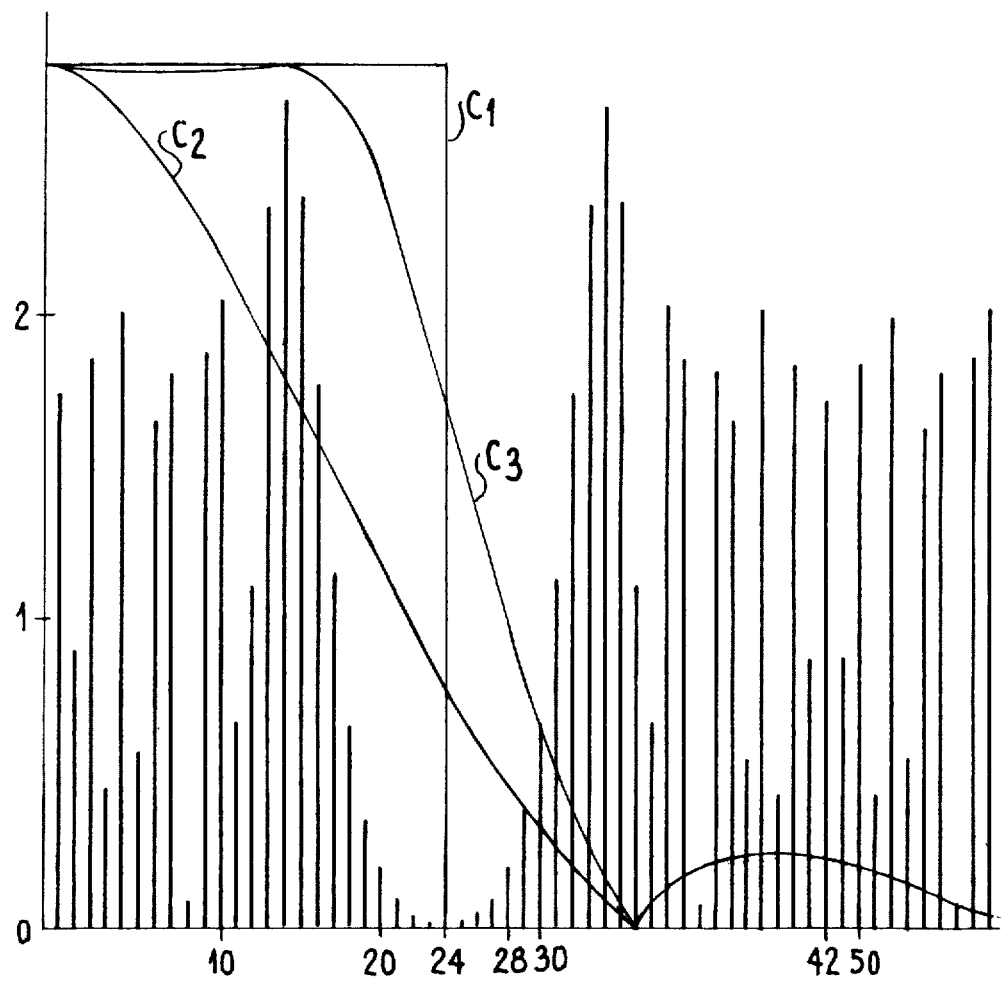
FIG_2

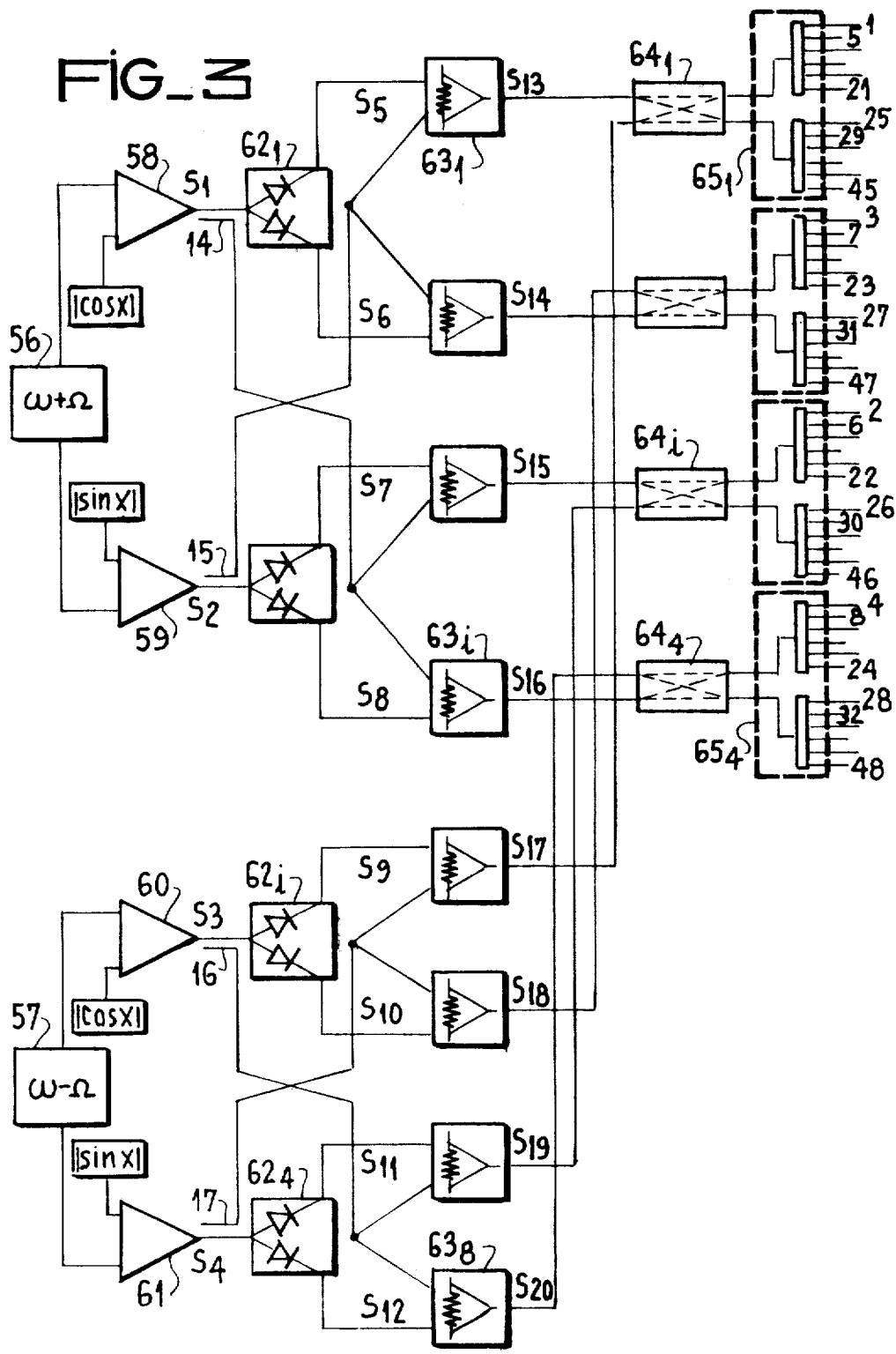

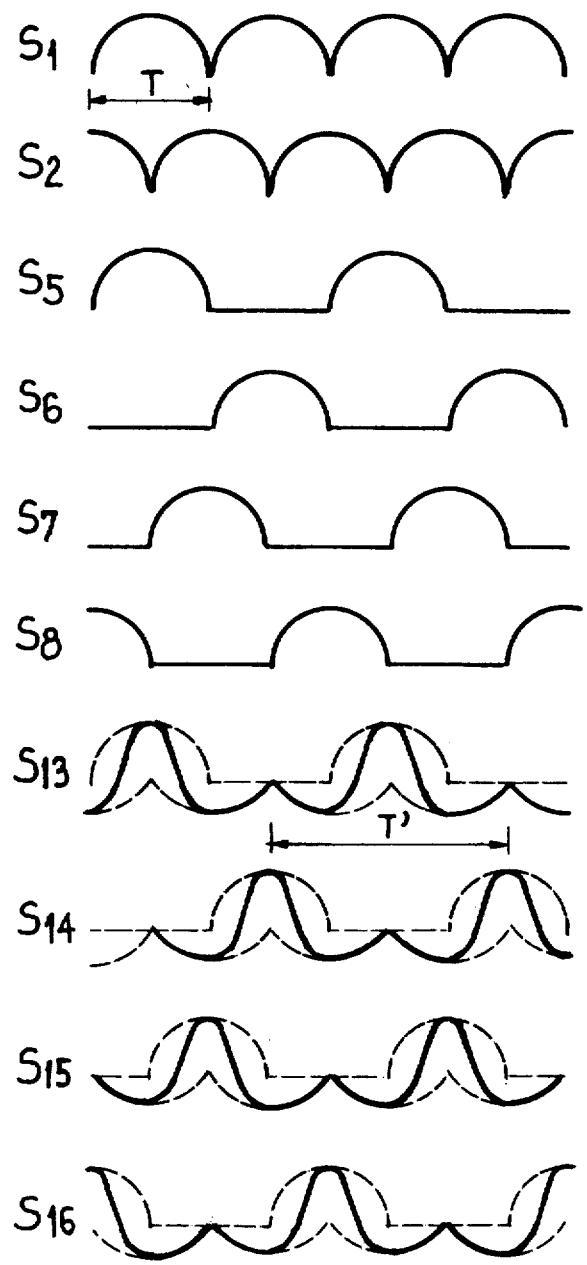
FIG_4

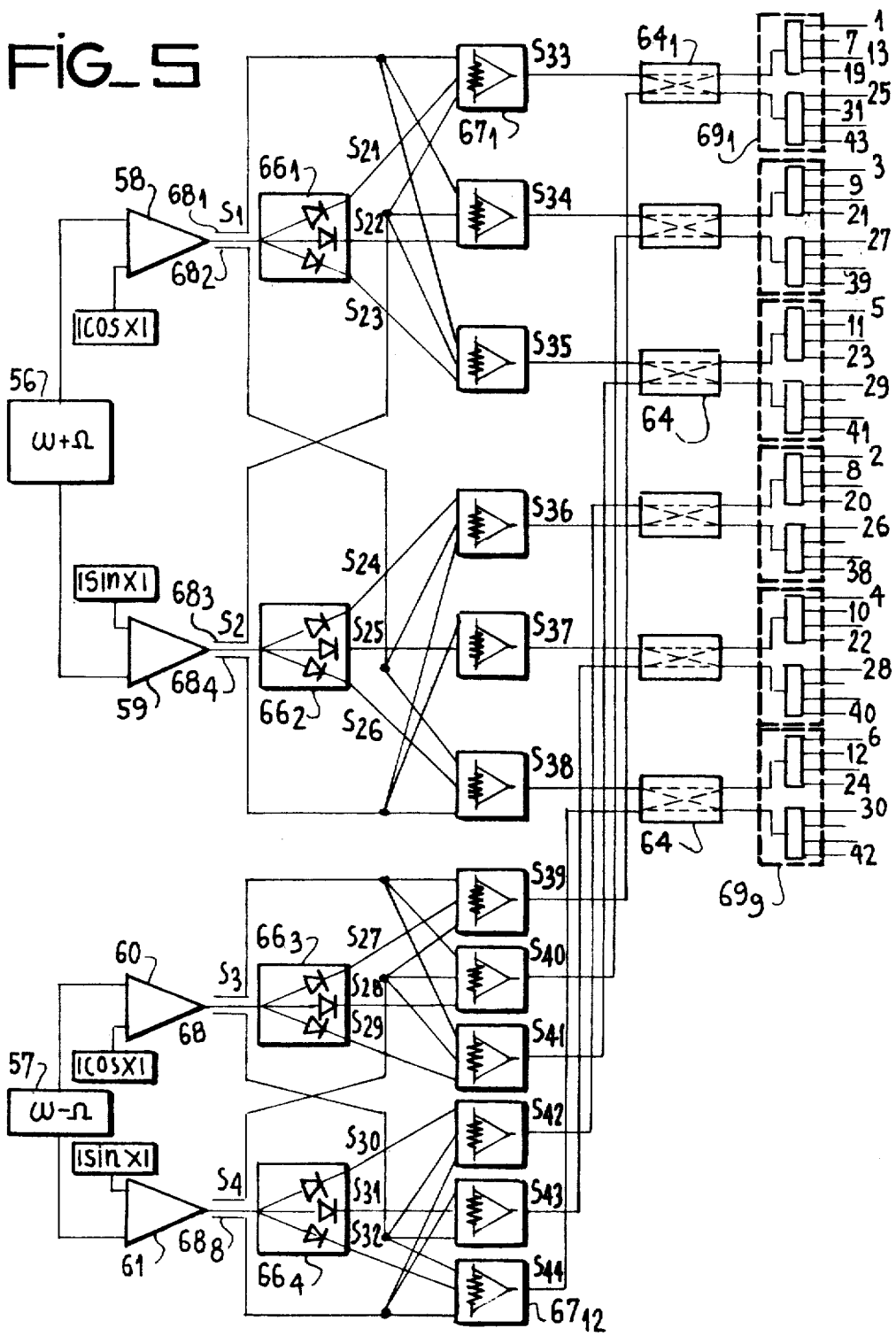

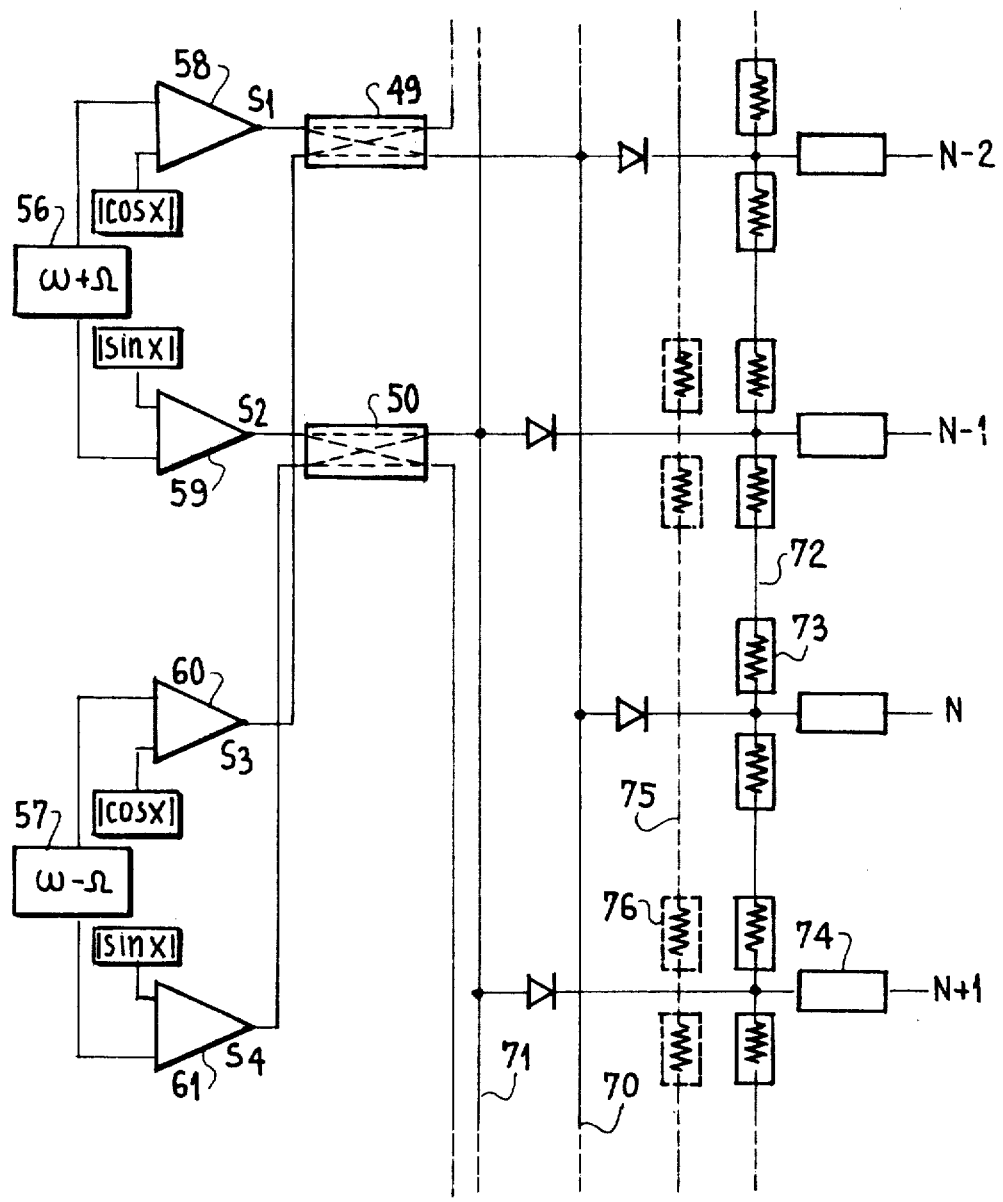
FIG_6

DEVICE FOR SUPPLYING A RADIONAVIGATION SYSTEM OF THE DOPPLER VOR TYPE AND A DOPPLER VOR SYSTEM COMPRISING SAID DEVICE

This invention relates to a device for supplying a radionavigation system of the Doppler VOR type.

A VOR system, that is, a very-high-frequency omnidirectional radio-range beacon, serves to deliver bearing information to each aircraft equipped with a suitable receiver, such bearing information being given with respect to a land-based radiobeacon whose geographic position is known. The constant increase in both national and international air traffic as well as the growing number of air routes makes it necessary for each country to provide maximum efficiency and reliability of radio signal coverage. VOR systems are used as air-route markers and form part of the national signal-coverage areas.

Since the VOR radiates a signal in the metric frequency band (108–118 MHz), the quality of this signal is dependent to a very large extent on the site location of the VOR. In point of fact, the omnidirectional radiation reflected by obstacles produces errors which are liable to make the system unserviceable. It is for this reason that, in highly uneven or hilly site locations, the conventional VOR is replaced by the Doppler VOR, the principles of which will be explained hereinafter.

In accordance with the general principle of the VOR system, the phase difference between two sine-wave signals at a frequency of 30 Hz which modulate a very-high-frequency carrier frequency is caused to correspond to the azimuth angle $\theta$ of the aircraft with respect to the magnetic north of the site of the ground-based transmitter. To this end, the antennas constituting the VOR system radiate a VHF (very-high-frequency) carrier wave which is amplitude-modulated on the one hand by a first low-frequency sine-wave having a frequency of 30 Hz and on the other hand by a second low-frequency wave having a frequency of 9960 Hz which is in turn frequency-modulated by a sine-wave signal having a frequency of 30 Hz.

A conventional VOR system radiates two signals:

an omnidirectionally-radiated "reference" signal consisting of a VHF carrier amplitude-modulated by a 9960-Hz subcarrier which is in turn frequency-modulated by a 30-Hz sine-wave signal;

a "variable" signal radiated in a figure-of-eight pattern at a rotational velocity of 30 revolutions per second and such that the LF envelope of the sidebands has a phase which is characteristic of the azimuth.

These two signals combine in free space so as to produce the complete VOR signal.

On the other hand, in a Doppler VOR system, the mode of transmission of the "reference" and "variable" information is reversed with respect to the conventional VOR. Thus the 30-Hz "reference" signal is transmitted omnidirectionally by amplitude modulation of the VHF wave and the azimuth information is transmitted by frequency modulation at 30 Hz of the two ±9960 Hz sidebands of the carrier wave. These two sidebands are emitted independently of each other by separate circuits. The omnidirectional pattern which transmits the reference information is radiated by the central antenna whereas the other pattern containing the azimuth information is obtained by causing two diametrically opposite antennas to rotate in a circle having a perimeter equal to the modulation index $K_o$ in wavelengths at the operating frequency, each antenna being supplied by one of the ±9960 Hz sidebands of the carrier frequency. The frequency of rotation of these antennas is 30 Hz. Thus the VOR signal emitted in a direction $\theta$ is of the form:

$$S = \cos \omega [1 + m \cos \Omega t + K_o \cos (\Omega_o t - \theta)]$$

with, in accordance with the standards laid down by the International Civil Aviation Organization (ICAO):

$\omega = 2\pi F$, where F is the VHF carrier frequency,
  $\Omega_o = 2\pi f_o = (2\pi/T_o)$, where $f_o$ is the frequency of rotation of antennas on the circle ($f_o = 30$ Hz),
  $\Omega = 2\pi f$, where f is the subcarrier frequency of the two ±9960 Hz sidebands,
  $K_o$ in radians being the perimeter of the circle ($K_o = 16\lambda$, namely approximately 42 m at the frequency employed)
  $\theta$ = azimuth of the receiver.

For practical reasons, the mechanical rotation of these antennas which transmit the two sidebands is impossible and is consequently simulated by switching of a circular array of fixed antennas in accordance with a suitable time function in order to simulate the progressive movement of the transmission point from one antenna to the next.

A number of solutions for transmission of the two sidebands of the amplitude modulation of the VHF carrier wave exist at the present time; in particular, it is possible to transmit either a single sideband or two sidebands in alternate sequence. However, preference will be given to a third solution which consists in transmitting the two sidebands simultaneously on two antennas or two diametrically opposite groups of antennas. FIG. 1 shows a current design of a device for supplying the circular array of antennas comprising an even number $N_o$ of antennas ($N_o = 48$ in the figure), which precisely permits simultaneous transmission of the two sidebands on four antennas. These four antennas are arranged in two diametrically opposite groups of two adjacent antennas.

The supply device comprises two inverters 49 and 50. The two inputs of the inverter 49 are supplied by means of two modulator-amplifiers 51 and 52 respectively by the upper sideband ($\omega + \Omega$) and lower sideband ($\omega - \Omega$), each sideband being amplitude-modulated by a HF periodic voltage F(t) having a period ($2T_o/N_o$) and a waveform which can have the shape of sine-wave arches, for example. The inverter 50 is supplied by means of two modulator-amplifiers 53 and 54 and similarly with the same voltage but displaced in time by ($T_o/N_o$), with $T_o = (1/f_o) = (1/30$ Hz) ($T_o$: period of rotation of the two ideal antennas of the Doppler VOR system). The two inverters 49 and 50 are connected to four switches 55 having one input and $N_o/4$ outputs permitting the supply of antennas designated by the reference numerals 1 to 48. In this manner and at a given instant, the upper sideband ($\omega + \Omega$) supplies two adjacent antennas (1 and 2, for example) whilst the lower sideband ($\omega - \Omega$) supplies the two antennas which are diametrically opposite to the first two antennas ($N_o/2) + 1$ and ($N_o/2) + 2$, namely 25 and 26 in the case $N_o = 48$).

But this simulation of the ideal continuous displacement of antennas is subject to a number of disadvantages. In the first place, it is found that the spectrum of the signal transmitted by all the antennas of the circular array has the appearance shown in FIG. 2, assuming that each antenna is supplied by a rectangular pulse having an infinitely short time-duration. The spectrum exhibits an inverted fold effect with a periodicity equal to the number $N_o$ of antennas of the array; all the lines having an order above 20 are parasitic. It is for this reason that it would be necessary to supply each antenna with a modulated HF voltage such that the envelope of its spectrum is of rectangular shape up to the line of order $N=20$ as indicated by the curve $C_1$; the curve $C_2$ represents the spectrum envelope obtained when the voltage has a sinusoidal arch waveform. To this end, a voltage of this type should be written:

$$F(t) = \frac{1}{N} \sum_{n=0}^{n=N} \cos n \, \Omega_o t = \frac{\sin N \Omega_o t}{N \sin \Omega_o t}$$

There would thus be obtained a radiated general signal in accordance with that of a pure frequency modulation of index $K_o=16$ by a sine-wave signal without modulation of amplitude and of parasitic phase. But a voltage of this type entails the need for simultaneous supply of all the antennas of the circular array in contrast to current designs.

A second drawback of the circular array of antennas for simulating ideal rotation arises precisely from the large number of antennas and from their proximity, thus resulting in parasitic coupling between them. In fact, experience shows that the radiation of one antenna has an influence on the radiation of the others, with the result that the amplitude and phase pattern of each antenna exhibits an appreciable departure from omnidirectionality (of the order of 10 dB in amplitude and of 50° in phase). Moreover, it is found that the double-sideband (DSB) Doppler VOR system exhibits high parasitic phase and amplitude modulations of the signals transmitted by the central antenna as a result of switching of the antennas of the circular array.

The effects arising from the non-ideal spectrum of radiated signals added to those of parasitic couplings lead to impaired performances of the Doppler VOR system of the prior art.

In accordance with a distinctive feature of the invention, the device for supplying a radionavigation system of the Doppler VOR type which radiates on the one hand omnidirectionally an amplitude-modulated VHF carrier wave and on the other hand the two sidebands of an amplitude modulation of said VHF wave, these two sidebands being amplitude-modulated by a periodic voltage F(t) and a device being provided for switching $N_o$ antennas of the circular array which radiates the sidebands, essentially comprises means for coupling and means for adding the amplitude-modulated sidebands so as to produce a signal for supplying antennas having a predetermined spectrum and to compensate for the couplings existing between said antennas.

In accordance with a further distinctive feature of the invention, the supply device comprises means for coupling and adding amplitude-modulated sidebands, said means being placed before the device for switching the antennas.

In accordance with yet a further distinctive feature of the invention, said coupling and adding means are placed between the switching device and the $N_o$ antennas of the circular array which transmits the sidebands of the VHF wave.

These and other features of the invention will be more apparent upon consideration of the following description and accompanying drawings, wherein:

FIG. 1 shows one example of construction of a device for supplying the circular array of antennas in accordance with the prior art;

FIG. 2 shows the spectrum of the signal transmitted by the array of antennas when these latter are each supplied by a pulse of infinitely short duration;

FIGS. 3 and 5 are diagrams of two different embodiments of a supply device in accordance with the invention;

FIG. 4 illustrates the different signals produced by the circuits of the supply device in accordance with the invention as shown in FIG. 3;

FIG. 6 illustrates another type of embodiment of a device for supplying the antenna array in accordance with the invention.

Elements designated by the same reference numerals in the different figures are identical and perform the same functions, in which case they will be described only once.

FIG. 3 is a diagram illustrating one embodiment of a device in accordance with the invention for supplying a VOR system. The two sidebands, namely the upper sideband $(\omega+\Omega)$ and lower sideband $(\omega-\Omega)$, are delivered respectively by two generators 56 and 57, then modulated by means of modulator-amplifiers 58 to 61 by a periodic HF voltage which is similar to the voltage F(t) described with reference to FIG. 1. In this case, F(t) is of the form cos X, with $0<X<\pi/2$ and $F(t+(T_o/N_o))$ is of the form sin X, with $0<X<\pi/2$. The signals $S_1$ to $S_4$ delivered by the modulator-amplifiers 58 to 61 each pass through a diode switch $62_i$ (where i varies from 1 to 4) for selecting one out of two arches of the signals $S_1$ to $S_4$. The signals $S_5$ to $S_{12}$ issuing from these switches are added in eight adding circuits $63_i$ (where i varies from 1 to 8) to a part of the signals $S_1$ to $S_4$ collected by four couplers 14 to 17. At the output of the four circuits $63_1$ to $63_4$, there is obtained a periodic antenna-supply signal corresponding to the upper sideband $(\omega+\Omega)$ having a period $(4T_o/N_o)$ but displaced in time by $(T_o/N_o)$ at each output of the circuits $63_1$ to $63_4$. Similarly, at the output of the four circuits $63_5$ to $63_8$, there is obtained a supply signal corresponding to the lower sideband $(\omega-\Omega)$ which is similar to the preceding. Four inverter circuits $64_i$ (where i varies from 1 to 4) each receive at the input the two supply signals corresponding in one case to the upper sideband and in the other case to the lower sideband, said signals being delivered respectively by the circuits $(63_1$ and $63_5)$, $(63_2$ and $63_6)$, $(63_3$ and $63_7)$ and $(63_4$ and $63_8)$. The outputs of these circuits are connected to four switches $65_i$ (where i varies from 1 to 4) which are identical with those described with reference to FIG. 1 and each comprise two inputs and twelve outputs to the antennas.

By virtue of this antenna-supply device, the signals which feed the switches $65_i$ in fact represent the two sidebands modulated by a HF voltage, the spectrum of which is close to a rectangular spectrum represented by curve $C_3$ of FIG. 2. The radiation of all the antennas of the circular array is thus similar to that of a pure frequency modulation having an index $K_o=16$.

There are shown in FIG. 4 the envelopes of the signals $S_1$ and $S_2$ which are the same as those of the signals $S_3$ and $S_4$; similarly, the envelopes of the signals $S_5$ to $S_8$ are identical with those of the signals $S_9$ to $S_{12}$. There are also shown in this figure the envelopes of the signals $S_{13}$ to $S_{16}$ delivered by the adding circuits $63_1$ to $63_4$, said envelopes being similar to those of the signals $S_{17}$ to $S_{20}$ which in turn represent the lower sideband. It can be observed that the period T' of the signals $S_{13}$ to $S_{16}$ is double the period T of the signals F(t) and $F(t+(T_o/N_o))$. Each antenna of the circular array which transmits the two sidebands $\omega\pm\Omega$ of the VHF carrier wave is thus supplied during a time interval which is twice as long as in prior art designs.

The appearance of the spectrum of the signal transmitted by the antenna array can be further improved by increasing the means for coupling and mixing the different modulated signals, in which case each antenna is supplied during a time interval T" which is three times longer than the previous time interval T.

FIG. 5 shows the supply device which produces a threefold increase in the antenna supply time. In the same manner as the device of FIG. 3, this device comprises two generators 56 and 57 for the sidebands $(\omega+\Omega)$ and $(\omega-\Omega)$ and four modulator-amplifiers 58 to 61 for modulating the sidebands with a HF voltage. The signals $S_1$ to $S_4$ delivered by these modulator-amplifiers each pass into a diode switch $66_i$ (where i varies from 1 to 4) for selecting one out of three arches of said signals. The signals $S_{21}$ to $S_{32}$ derived from said switches are added in twelve adding circuits $67_i$ (where i varies from 1 to 12) to a part of the signals $S_1$ to $S_4$ which is collected by eight couplers $68_i$ (where i varies from 1 to 8). From this it accordingly follows, for example, that the signals $S_{21}$, $S_{22}$ and $S_{23}$ derived from the switch $66_1$ are each added on the one hand to a part of the signal $S_1$ which is collected by the coupler $68_1$ and on the other hand to a part of the signal $S_2$ which is collected by the coupler $68_3$. Similarly, the signals $S_{24}$, $S_{25}$ and $S_{26}$ derived from the switch $66_2$ are added on the one hand to a part of the signal $S_1$ which is collected by the coupler $68_2$ and on the other hand to a part of the signal $S_2$ which is collected by the coupler $68_4$. The antenna supply signals $S_{33}$ to $S_{38}$ at the output of the circuits $67_1$ to $67_6$ corresponding to the upper sideband $(\omega+\Omega)$ are periodic and have a period $(6T_o/N_o)$ but are displaced in time by $T_o/N_o$ at each output of the circuits $67_1$ to $67_6$. The same applies to the signals $S_{39}$ to $S_{44}$ corresponding to the sideband $(\omega-\Omega)$. Six inverter circuits $64_i$ (where i varies from 1 to 6) receive respectively the signals ($S_{33}$ and $S_{39}$), ($S_{34}$ and $S_{40}$), ($S_{35}$ and $S_{41}$), ($S_{36}$ and $S_{42}$), ($S_{37}$ and $S_{43}$) and ($S_{38}$ and $S_{44}$) and supply four switches $69_1$ to $69_4$ which are in turn connected to the antennas of the circular array.

As stated earlier, the large number and proximity of the antennas give rise to parasitic coupling effects. Accordingly, the levels of the signals $S_1$ and $S_2$ collected by the couplers in FIGS. 3 and 5 must take these couplings into account. Their most harmful influence is not produced by adjacent antennas but by the more remote antennas by reason of the greater distance between the phase centers of the antennas.

Better coupling compensation is obtained by means of the supply device illustrated in FIG. 6. The signals $S_1$ to $S_4$ are obtained in the same manner as in FIG. 1 which represents the prior art supply device in which the two inverters 49 and 50 are connected to four switches. The figure illustrates only two switches 70 and 71 which are supplied by the two signals of the prior art $F(t)\cdot\cos(\omega+\Omega)t$ and $F(t+(T_o/N_o))\cos(\omega+\Omega)t$ representing the supply voltages of the even-numbered and odd-numbered antennas. At the outputs of said switches, provision has been made for connecting lines 72 and coupling elements 73 which serve to interconnect the antennas of successive rows. Considering the time-dependent variation of the signal transmitted by the antenna N, it is apparent that a fraction of the energy emitted by the antenna N-2 will be emitted at the same instant with an amplitude and a phase determined by the coupling elements 72 and 73. During the time of supply of the antenna N-1, a fraction of its energy will then be emitted by the antenna N.

It can thus be seen that, in the case of a given antenna, there is obtained a transmission signal which is similar to the signal obtained by means of the embodiments described in the previous figures, although the approximation is necessarily not as good. In order to improve this device, it is possible on the one hand to place an element 74 between the connecting lines and the input of each antenna, thus optimizing the load impedance of the antennas, taking into account the impedance reduced by the lines 72 and the elements 73. It is possible on the other hand to add supplementary lines 75 and coupling elements 76 for connecting one antenna out of two so as to provide a better definition of the signals transmitted by the most distant antennas.

In one example of construction which is not given in any limiting sense, the elements 74 are simple transformers of ratio 2:1 and the coupling elements 73 are series resistors.

There has thus been described a device for supplying a Doppler VOR system, the performances of which are distinctly improved with respect to those of the prior art. By virtue of this novel device, parasitic phase and amplitude modulations of the carrier wave transmitted by the central antenna are considerably reduced and the same applies to the two sidebands transmitted by the circular array of antennas.

We claim:

1. A device for supplying a radionavigation system of the Doppler VOR type for radiating in particular the two sidebands of an amplitude modulation of a VHF carrier wave, comprising means for generating the sidebands, and said means in the case of each sideband comprising a generator and two modulator-amplifiers for amplitude-modulating the signal derived from the generator by means of a periodic voltage F(t), a device for switching the $N_o$ antennas of the circular array which radiates said sidebands, in said Doppler VOR said device comprising means for coupling and means for adding the amplitude-modulated sidebands so as to produce a signal having a predetermined spectrum for supplying said antennas and to compensate for the coupling existing between said antennas.

2. A supply device according to claim 1, wherein the means for coupling and the means for adding the amplitude-modulated sidebands are placed before the device for switching the antennas.

3. A supply device according to claim 1, wherein the means for coupling and the means for adding amplitude-modulated sidebands are placed between the switching device and the $N_o$ antennas of the circular array.

4. A supply device according to claim 2 wherein, in the case of each sideband, the coupling means are comprised of two couplers for collecting a predetermined part of the periodic signals derived from the modulator-amplifiers and the adding means are comprised of two switches for collecting one period out of two of the signals and of four adders for adding the collected portion of the signals to the signals derived from the switches, the output signals of the adders being such as to correspond to the two sidebands which supply the device for switching the $N_o$ antennas of the array.

5. A supply device according to claim 2 wherein, in the case of each sideband, the coupling means are comprised of four couplers each adapted to collect a part of the periodic signals derived from the modulator-amplifiers and the adding means are comprised of two switches for collecting one period out of three of the signals and of six adders for adding the collected part of the signals to the signals derived from the switches, the output signals of the adders being such as to correspond to the two sidebands which supply the device for switching the $N_o$ antennas of the array.

6. A supply device according to claim 3, wherein provision is made at the output of the switching device for connecting lines and coupling elements for interconnecting the antennas of successive rows of the circular array which radiates the sidebands of the amplitude modulation of the VHF carrier wave.

7. A supply device according to claim 6, wherein provision is made between the connecting lines and each antenna for an element which optimizes the load impedance of the antennas, taking into account the impedance reduced by the lines and the elements.

8. A supply device according to claim 7, wherein connecting lines and supplementary coupling elements interconnect the antennas of different rows of two units.

9. A supply device according to claim 7 or claim 8, wherein the coupling elements are series resistors and the elements for optimizing the load impedance of the antennas are transformers of ratio 2:1.

10. A Doppler VOR system comprising a supply device according to claim 1.

* * * * *